Patented May 2, 1950

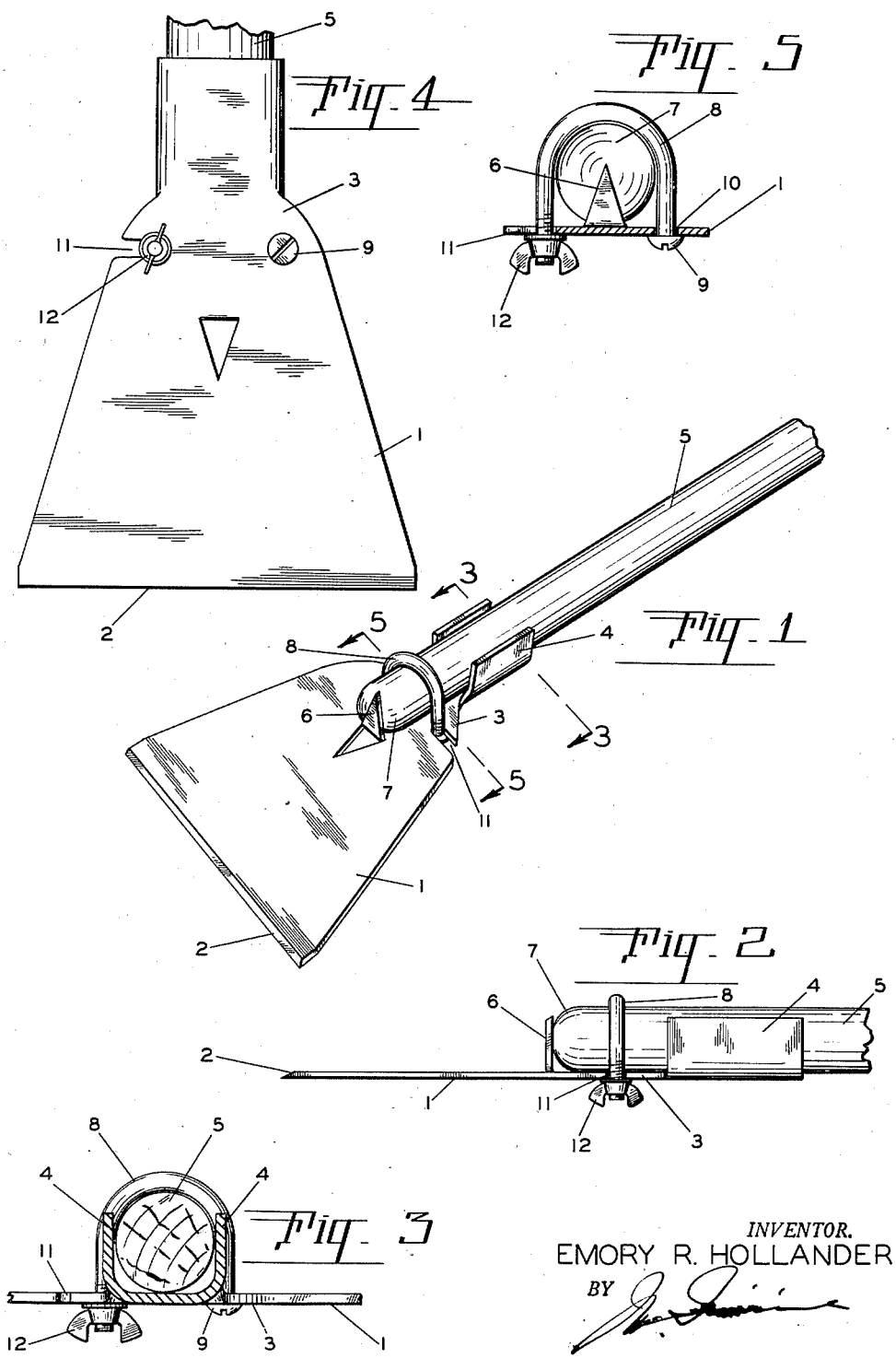

2,506,083

UNITED STATES PATENT OFFICE 2,506,083

SCRAPER

Emory R. Hollander, Portland, Oreg.

Application March 4, 1949, Serial No. 79,660

3 Claims. (Cl. 30—169)

This invention relates to scrapers and is particularly adapted to be applied to broom handles or other similar objects.

The primary object of the invention is the providing of a scraper attachment to be applied to the end of a broom handle permitting the operator to use the scraper on floors and still have the broom in his hands for sweeping.

Another object of the invention is to provide a scraper that can be removed from the broom and easily stored away while not in use.

These and other incidental objects will be apparent in the drawings, specification and claims.

Referring to the drawings:

Figure 1 illustrates how my new and improved scraper can be clamped to the end of a broom handle or other similar object.

Figure 2 is a side view of the scraper.

Figure 3 is an end view taken on line 3—3 of Figure 1.

Figure 4 is an inverted plan view of the scraper.

Figure 5 is an end sectional view taken on line 5—5 of Figure 1, the handle having been removed, illuustrating the clamping arrangement.

Referring more specifically to the drawings:

My new and improved scraper consists of a blade 1, being relatively wide across its bevel edge 2 and tapering back to its rear portion 3. Ears 4 forming part of the blade are upturned and adapted to receive the handle 5 therebetween. Punched up from the bottom of the blade is a barb or stop 6 against which the end 7 of the handle is adapted to rest.

A special U-clamp 8, having a head 9, passes through the opening 10 of the blade 1, best illustrated in Figure 5, and re-enters the slot 11 and is adapted to receive the wing nut 12.

In the assembling of my new and improved scraper blade with a broom handle or like object, the wing nut 12 is loosened permitting the handle to enter between the ears 4 and under the U-clamp 8, the end of the handle then coming against the stop 6. When the wing nut 12 is tightened the scraper will be securely positioned and held on the end of the handle.

With my new and improved scraper it can be stored in convenient storage space, as for instance utensil drawers, and can be readily adapted to the broom handle while sweeping the floors, so that the operator can scrape the floor, reverse the broom and sweep without having to be bothered with two separate implements, as is the case where a separate broom and a scraper is being used.

Further, the scraper can be readily cleansed and sterilized after using, which while scraping tables, as is found in bakeries and the like where it is rather important that the scraper be kept clean and sterilized.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A scraper comprising a sheet member having a scraper blade formed on its front edge, spaced ears extending perpendicularly at the rear of said sheet member and defining a handle receiving channel that is perpendicular to said scraper blade, a stop struck perpendicularly from said sheet member in front of said channel for end abutment with a handle extending in the same plane as the sheet member and seated in the channel with the end in contact with the stop, and a U-clamp extending through said sheet member between said stop and said ears for extending around the handle nested in said channel and abutting said stop, and means for clamping the handle to the sheet member.

2. A scraper comprising a sheet member having a scraper blade formed on its front edge, spaced ears formed perpendicularly at the rear of said sheet member and defining a handle receiving channel that is perpendicular to said scraper blade, a stop struck perpendicularly from said sheet member in front of said channel for end abutment with a handle, a hole through said sheet member substantially in front of one of said ears, a slot extending inwardly from the side of said sheet member and substantially in front of the other of said ears, said hole and slot being located between said stop and said ears, and a U-clamp extending through said hole and slot for extending around a handle nested in said channel and abutting said stop.

3. A scraper comprising a sheet member having a scraper blade formed on its front edge, spaced ears extending perpendicularly at the rear of said sheet member and defining a channel that is perpendicular to said scraper blade, a stop struck perpendicularly from said sheet member in front of said channel, a handle extending in the same plane as the sheet member and nested in said channel and in end abutment with said stop, and a U-clamp extending through said sheet member between said stop and said ears and extending around said handle to retain said handle nested in said channel and abutting said stop, a head on one end of the U-shaped member to engage the bottom of the sheet member, the opposite end of the U-shaped member having screw threads, and a nut engaging the threads and engaging the bottom of the sheet member to bind the handle and sheet member together.

EMORY R. HOLLANDER.

REFERENCES CITED

The following references are of record in the file of this patent:

UNITED STATES PATENTS

| Number | Name | Date |
| --- | --- | --- |
| 139,369 | Cobb | May 27, 1873 |
| 1,621,273 | Read | Mar. 15, 1927 |